UNITED STATES PATENT OFFICE.

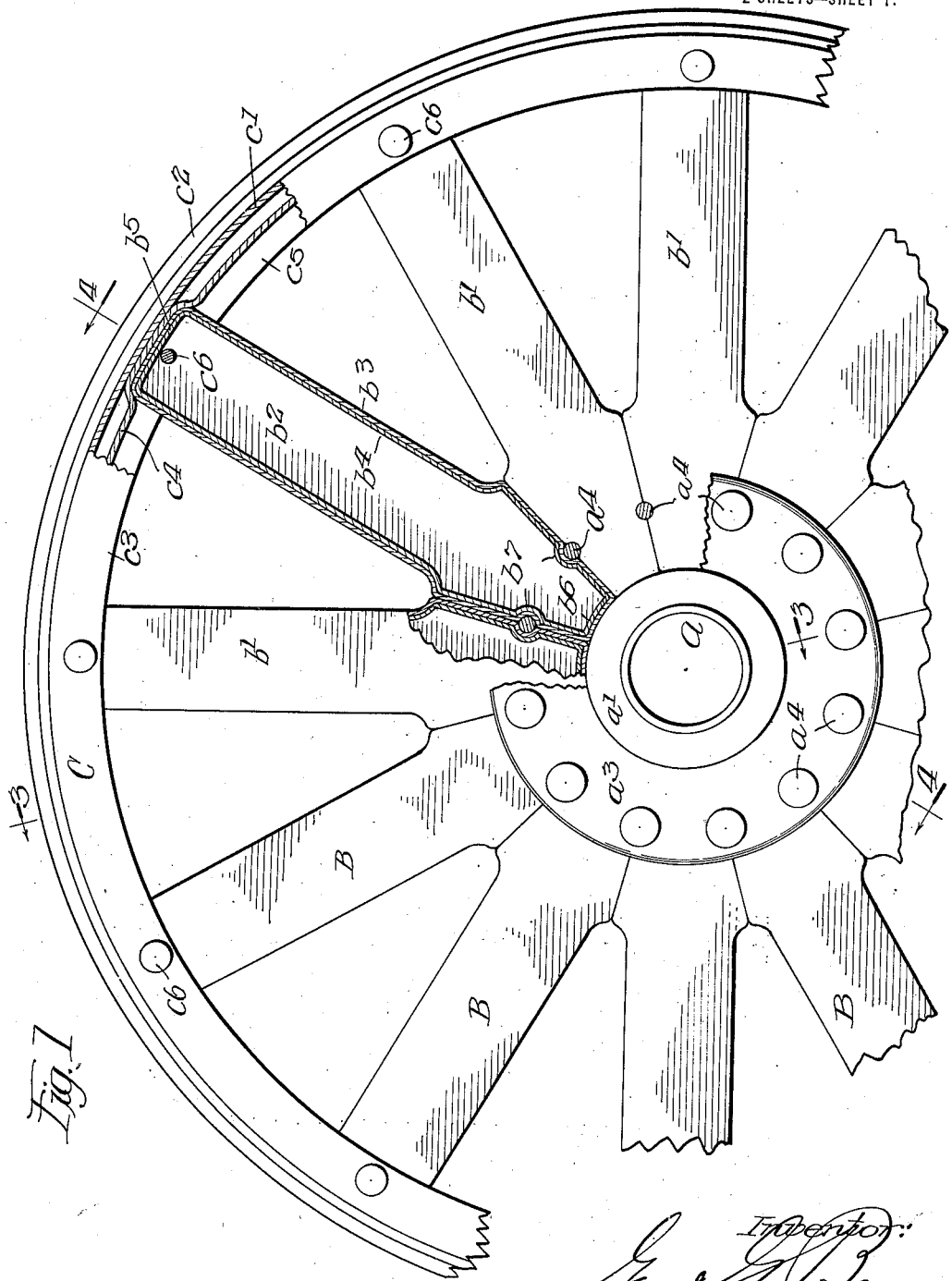

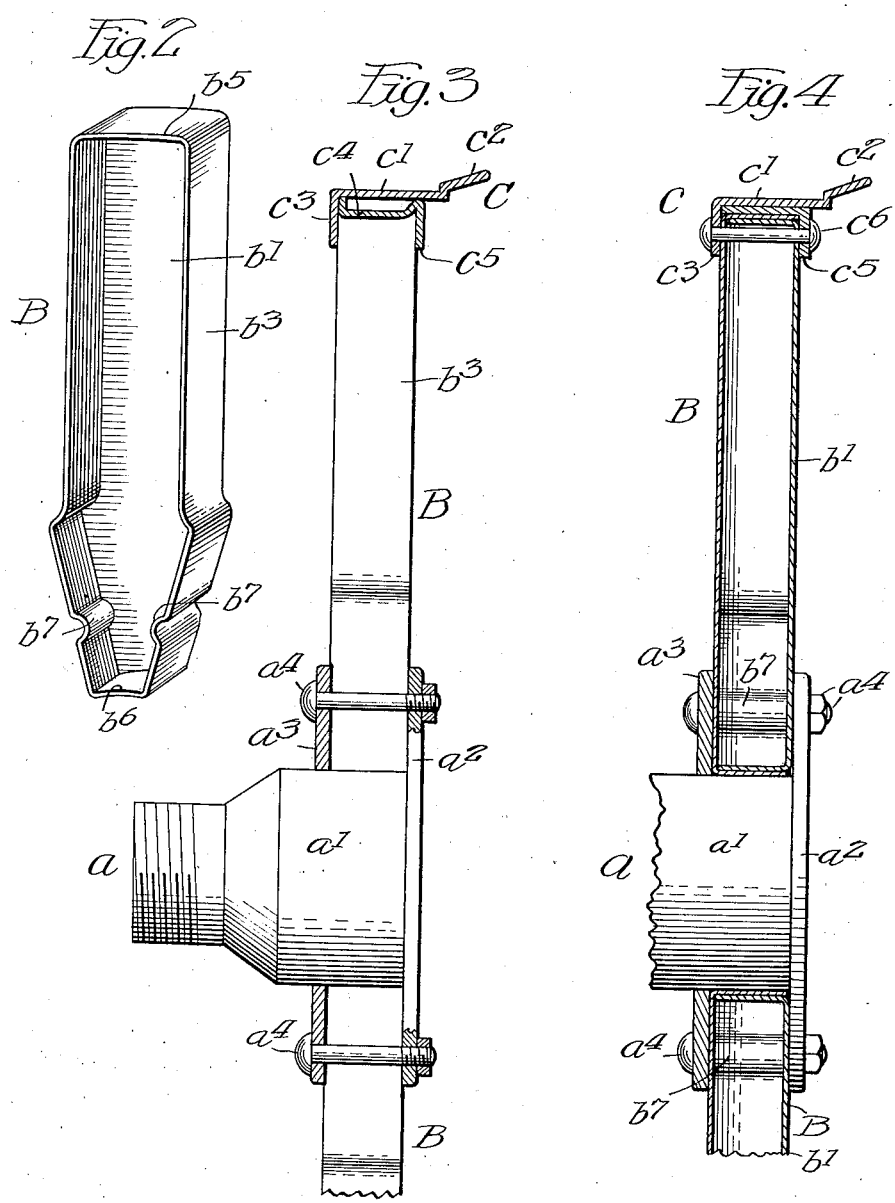

GERALD G. BARRY, OF CHICAGO, ILLINOIS.

METAL WHEEL.

1,389,179.   Specification of Letters Patent.   Patented Aug. 30, 1921.

Application filed August 9, 1919. Serial No. 316,513.

*To all whom it may concern:*

Be it known that I, GERALD G. BARRY, a citizen of the United States, and a resident of Chicago, in the county of Cook and State of Illinois, have invented certain new and useful Improvements in Metal Wheels, of which invention the following is a specification.

The present invention relates principally to wheels wherein the supporting structure between the hub and rim members is comprised of a series of metal spokes formed and secured as hereinafter described, and the object of the invention is to provide a wheel which is light in weight, yet capable of withstanding severe driving stresses, is simple and low in cost of construction, and has other advantages which will be apparent to the manufacturer and user of such wheels.

In the accompanying drawings forming part of this specification, like letters or marks of reference are used to designate similar parts throughout the several figures.

Figure 1 is a partly broken side elevation of the new wheel; Fig. 2 is a detail view of one of the metal spoke members; Fig. 3 is a transverse view on the arrowed line 3—3 of Fig. 1; and Fig. 4 is a transverse section through the rim and spoke,—the main hub body not being sectionized,—taken on the arrowed line 4—4 of Fig. 1.

The hub member, generally speaking, is designated by A. The hub in connnection with which the new spoke and rim structure is here illustrated may be recognized as an ordinary form of automobile front wheel hub, but of course any other suitable hub member may be employed. In that shown, $a'$ is the main hub body; $a^2$ denotes the customary integral flange extending outwardly from and following circumferentially around the inner end of the main hub body; and $a^3$ is a removable flat ring or clamping plate, between which and the integral flange $a^2$ the series of metal spokes, to be presently described, are secured in place upon the central hub body by the bolts or other suitable fastening means $a^4$, much the same as wooden spokes are secured.

Element B, the supporting structure between the hub A and rim C, is comprised of a series of metal spokes, preferably drawn from sheet metal, and each spoke also preferably consisting of two complemental members as shown, one being formed just sufficiently smaller than the other that the flanges of the two can be telescoped together. Fig. 2 shows one of these drawn members; and the other views show same in their assembled relation. For distinction, $b^1$ here marks the outer face of the spoke body, and $b^2$ the inner face on the complemental member. These are exactly alike in outline, except one is slightly smaller than the other, as already mentioned. They are parallel but spaced apart, substantially the width of an ordinary spoke, and I prefer in a plane at right angles to the axis. The original blank from which each of the complemental spoke members is formed is sufficiently large so that an integral flange is drawn or struck over from each, the flange on $b^1$ being marked $b^3$ and that on the inner member $b^2$ being marked as $b^4$. These integral flanges $b^3$ and $b^4$, it will be observed, follow continuously around the outline of their respective main bodies, not only to form the sides of the spoke but also at the outer or rim end $b^5$ and as well the end $b^6$ resting on the hub body $a^1$. Of course, in instances where the hub or shaft fitting is very small, the curved end $b^6$, here shown conforming to the outer face of the hub body $a^1$, might be eliminated and the sides carried nearer to a point. The depth of these flanges $b^3$ and $b^4$ preferably corresponds to the width of the spoke, so that when the flange $b^4$ is forced within the flange $b^3$ there is a double thickness of the sheet metal around the outline of the entire spoke extending substantially across the spaced distance between the parallel plates $b^1$ and $b^2$. The snugly telescoped relation of these flanges is shown in the one partly sectionized spoke in Fig. 1. Where the inner end of adjacent spokes abut when assembled there is thus provided four thicknesses of the sheet metal. It will be apparent that with the use of a relatively thin and light weight sheet a spoke structure constructed and assembled as herein shown will have the capacity to withstand severe side thrust as well as all other driving stresses.

Near the hub end of each spoke the flanges are indented or formed so as to provide a half round channel $b^7$, which, matched up with the corresponding channel on the adjacent spoke, forms an opening through which the clamping bolt $a^4$ may pass and makes unnecessary drilling the spoke body for this purpose. The outer end of each spoke may be similarly formed, instead of having the rim clamping bolts $c^6$ pass through as here illustrated.

C denotes the rim element. As the new wheel was devised primarily for automobiles the drawings illustrate my preference in this connection, although it will be obvious that other forms of rims may be employed. In Fig. 3 and Fig. 4 the transverse sections show a rim band $c^1$, provided with the outwardly flaring flange $c^2$ on its inner edge, as customary with rims adapted to receive a demountable tire carrying rim. The said demountable rim and the means of securing same in place on the wheel rim $c^1$ and against the flange $c^2$ is not shown, however, it being deemed unnecessary, and in fact is not a part of the present invention as the flange $c^2$ may be dispensed with and the plain tread $c^1$ employed. There is, however, also provided an integral inwardly extending circumferential flange $c^3$ on the band $c^1$. There is also a further circumferential band $c^4$, provided with an integral inwardly extending flange, marked $c^5$, the flanges $c^3$ and $c^5$ being on opposite sides of the spokes. The band $c^4$ is smaller in diameter than the band $c^1$ and is telescoped within the latter. The flanged ends $b^5$ of the spokes press against the under face of the band $c^4$. At this point, over the spoke ends, the two bands $c^4$ and $c^1$ are in close contact, as shown in Fig. 1 and Fig. 4. Between adjacent spokes, however, the band $c^4$ may be formed so as to extend somewhat below the spoke ends, at least at the flange sides of the spokes, conforming to the rounded junction of the side with the end of the spokes, providing a shoulder at each side, as shown in Fig. 1 and Fig. 3. Where the depression extends across between spokes, the outer edge of the band $c^4$ is struck up and in contact with the band $c^1$, as shown in Fig. 3. The series of spokes are arranged in place between the rim band $c^4$ and the hub body $a^1$. The outer flanged rim $c^1$ is then forced into position, and secured by the rivets $c^6$, extending through the spoke ends from one overhanging side flange $c^3$ to the flange $c^5$ on the opposite side, or other suitable fastening means employed. The hub ends, of course, are secured between the flange $a^2$ and the removable clamping ring $a^3$ by the fastening means $a^4$, as already mentioned.

The invention embodies features of considerable and growing commercial importance. The supply of the proper kind of wood is becoming scarce and the material and labor costs mounting in the manufacture of wood wheels, as well as there being lacking other advantages provided by the present invention. Some cast steel wheels are used on heavy vehicles, but as cast metal has such a low "elastic point" they are liable to crack under the shocks of heavy loads, so that the ordinary cast wheel is made altogether too heavy and costly. They must be machined, and unless a very liberal thickness is allowed in the walls, there is difficulty in getting the metal to flow properly, resulting in many "lost" casts. Wire wheels, while light, are excessive dirt collectors and difficult to clean, and the adjusting and assembling costs very high. Furthermore, they do not hold their balanced adjustment but require frequent attention, and are particularly subject to "buckling" or damage in skidding or striking a street curbing or other obstruction. Sheet metal disk wheels have some advantages which have more recently brought them favorable attention. The per pound capacity of a relatively thin sheet metal plate when placed on edge to withstand enormous load strains is well known, but in vehicle wheels this danger from the twisting or lateral strains is an important one to be guarded against and the ordinary single disk wheels frequently "buckle," and difficulty is also found at the fastening of the thin wall to the hub. With the construction in accordance with the present invention, however, the practical conditions, it will be apparent to the manufacturer and user, have been quite satisfactorily provided for. There is in effect a hollow box-like steel spoke. The telescoped double thickness of the flanges and the spacing apart of the two main face plates $b^1$ and $b^2$ provides a wide and strong body, permanently fastened at the rim and hub and practically impossible to buckle or damage either by lateral or other operating strains. The forming and assembling operations are very simple and not costly, and the complete wheel presents a pleasing appearance, is light, strong, easily cleaned and altogether serviceable.

It will be apparent that various changes may be made in the wheel herein chosen for illustration without departing from the spirit and scope of the invention, and I do not wish any undue limitation to result from the detailed description given, but desire the claims appended hereto to be construed as broadly as possible in view of the prior art relating to such wheels.

What I claim as new and desire to secure by Letters Patent is the following:

1. In a wheel, the combination with suitable hub and rim members of a supporting structure between the said two members consisting of a series of spokes, each spoke comprising a complemental pair of pressed metal members, the main body plates being spaced apart, an integral flange on each following around the body plate, the flange from one side plate telescoped within the other, and both said flanges extending substantially across the spaced distance between the main plates, substantially as set forth.

2. In a wheel the combination with suitable hub and rim members of a supporting structure between the said two members consisting of a series of spokes, each spoke comprising a complemental pair of pressed metal members, the main body plates being spaced apart, an integral flange on each following around the body plate, and the flange from one side plate telescoped within the other, substantially as set forth.

3. In a wheel of the character described, a rim member comprising a pair of concentric bands, one fitting closely within the other, each band having an integral hubwardly directed flange, the two flanges being arranged on opposite sides of the spokes and the outer ends of the spokes clamped therebetween, and the inner band being also provided with inwardly depressed portions transversely thereof at the sides of each spoke providing a shoulder conforming to the spoke end, substantially as described.

4. In a wheel of the character described, a rim member comprising a pair of concentric bands, one fitting closely within the other, each band having an integral hubwardly directed flange, the two flanges being arranged on opposite sides of the spokes and the outer ends of the spokes clamped therebetween.

5. In a wheel having a series of metal spokes, the spoke members comprising a main body plate the outer end of which conforms to the rim member and the inner end to the hub member and having a flange formed integrally with the main body plate, following continuously around the same and extending substantially the full width of the spoke.

6. In a wheel, the combination of a hub having an outwardly extended fixed inner flange and a removable outer flange, the said hub flanges being spaced apart, a rim, and a supporting structure between the hub and rim, the latter including a series of independent metal spokes, adapted to be secured upon the hub between said flanges thereof, each said spoke comprising a main face plate in a plane at right angles to the axis and having formed integrally with said face plate a flange extending across the spaced distance between the said hub flanges, and means for securing the outer spoke ends to the rim.

In testimony whereof I have hereunto signed my name to this specification.

GERALD G. BARRY.